UNITED STATES PATENT OFFICE.

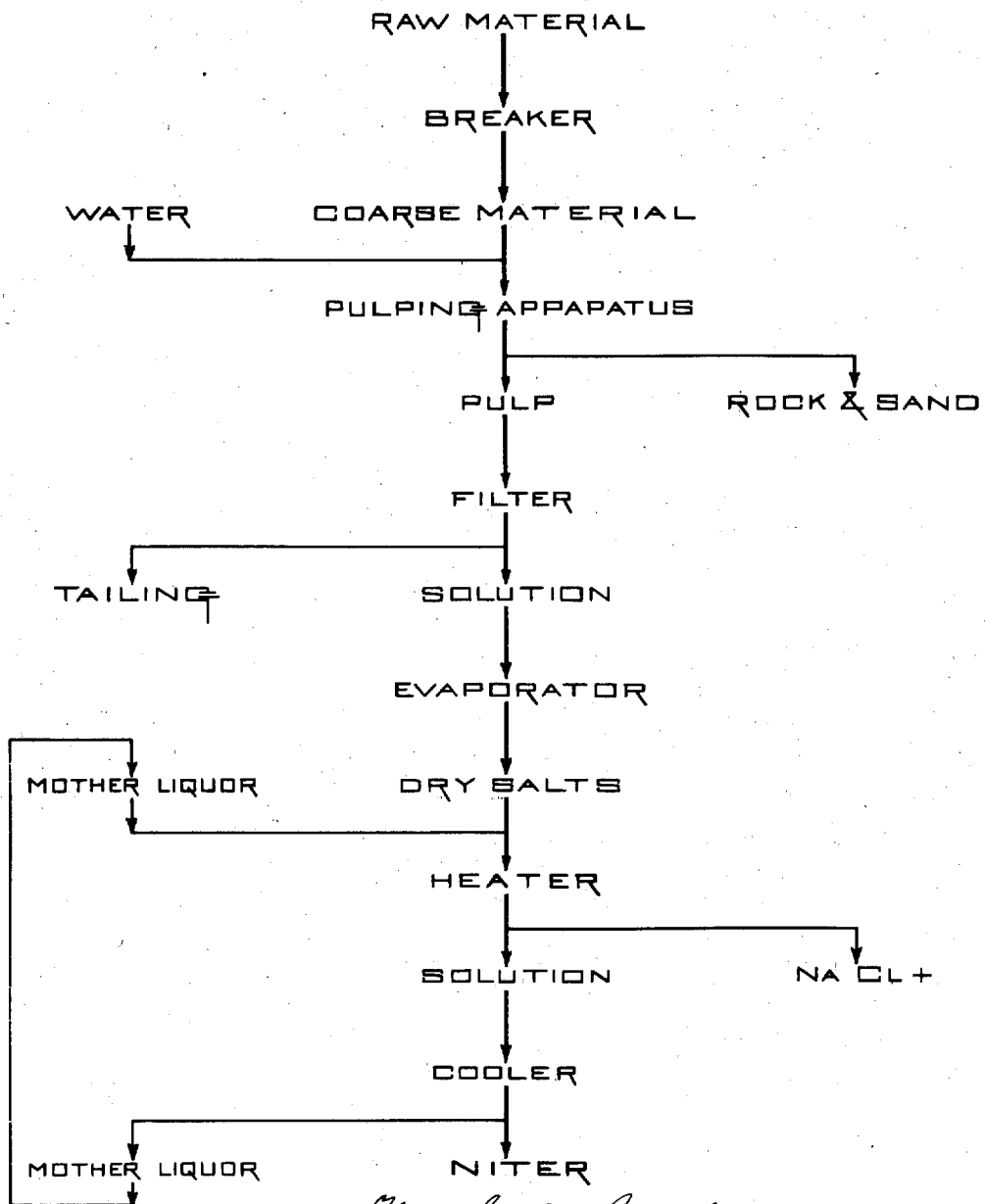

MARK R. LAMB, OF MILWAUKEE, WISCONSIN, ASSIGNOR TO ALLIS-CHALMERS COMPANY, OF MILWAUKEE, WISCONSIN, A CORPORATION OF NEW JERSEY.

PROCESS OF EXTRACTING SODIUM NITRATE FROM RAW MATERIAL.

1,065,053.     Specification of Letters Patent.     Patented June 17, 1913.

Application filed August 15, 1910. Serial No. 577,284.

*To all whom it may concern:*

Be it known that I, MARK R. LAMB, a citizen of the United States, residing at Milwaukee, in the county of Milwaukee and State of Wisconsin, have invented a certain new and useful Process of Extracting Sodium Nitrate from Raw Material, of which the following is a specification.

This invention relates to an improved process of recovering free sodium nitrate or niter from raw niter-bearing material such as is found in the niter beds of Chile, California and other localities.

The object of the invention is to provide a method or process of separating niter from niter-bearing substances, which is easily worked and by means of which a maximum percentage of the niter contained in the raw material can be recovered at a minimum cost of extraction.

A clear conception of one adaptation of the invention can be had by referring to the accompanying drawing.

The drawing shows diagrammatically the flow or passage of the raw niter-bearing material through the essential steps of the process.

The raw niter-bearing material is broken into lumps of sufficient size to permit easy subsequent treatment thereof. It should however be understood that it is not desired to pulverize the material, but merely to break up the large lumps.

The size will vary but for example it may be assumed to be equivalent to the standard sizes of commercial anthracite coal.

The coarse broken material is fed into the pulping apparatus where it is thoroughly disintegrated and mixed with water which enters from a water tank or other suitable supply.

The pulping apparatus would comprise all the means including the means for removing the rock and sand, if any, used for transforming the material from its coarse broken state to that of a slime or pulp ready for separating out the clear solution. This separating of the solution and the washing of the residue are preferably done in a vacuum filter, although any other suitable type of filter or filter press could be substituted or the slimes could be subjected to decantation. The products of the separation are the tailing, which contains practically no niter, and the solution which contains niter and possibly sodium chlorid and other soluble salts. The solution is then passed to an evaporator. This may be either one which is artificially heated, or it may be one in which there is increased exposure to space of the surface of the solution for spontaneous evaporation, such as an evaporating tower or pond. Where the artificial evaporation is made use of, this step is continued only to concentrate the solution nearly to niter saturation at between 100 and 120 degrees centigrade, during which concentration the excess of sodium chlorid is removed in crystalline form. Where the spontaneous evaporation is made use of, it is carried to dryness.

In order to eliminate the necessity of using fuel to produce artificial evaporation, the feature of using spontaneous evaporation is perfectly applied in the present process.

The dry salts taken from the evaporator are transferred to a heater containing a supply of mother liquor, which is the final liquid withdrawn from the niter product resulting from a previous operation of this process. Either or both of these constituents of the mixture may be preliminarily heated to any temperature up to the boiling point, say 120°. The quantity of the dry salts transferred is that necessary to form a saturated solution of niter at a temperature near its boiling point, which is 120 degrees centigrade. The amount of niter in the dry salts and the quantity of dry salts transferred will of course vary with the condition of the raw materials used. All of the sodium chlorid in the dry salts transferred from the evaporator to the heater is withdrawn, sufficient time having been allowed to dissolve all the niter.

The heater is essentially for the purpose of raising the temperature of the mixture and not necessarily for evaporation, and the quantity of sodium chlorid in the mother liquor is of course not sufficient to be crystallized out on heating.

The solution is conducted to a cooler where, upon cooling, the niter alone crystallizes from the solution and is removed and sacked ready for marketing. The degree of cooling is not fixed and may be to any temperature that can be most easily attained. Any sodium chlorid contained in the solution, however, is not deposited during cooling because the capacity of the cooling niter solution for sodium chlorid increases as the temperature decreases. The remaining solution constitutes the " mother liquor."

It should be understood that it is not desired to be limited to the specific details of the described adaptation of the process, as various modifications of same may occur to a person skilled in the art.

It is claimed and desired to secure by Letters Patent,—

1. The process of extracting sodium nitrate from raw material which consists in adding water thereto and of removing the rock and sand from the mixture whereby a pulp remains, separating the insoluble matter therefrom, evaporating the remaining solution, adding liquor to and heating the product of said evaporation, removing sodium chlorid, and separating sodium nitrate from the remaining product.

2. The process of extracting sodium nitrate from raw material which consists of coarse breaking the raw material, adding water to said broken material, separating the pulp from the mixture, separating the insoluble matter therefrom, concentrating the remaining solution whereby sodium chlorid is crystallized therefrom, removing said sodium chlorid, and separating sodium nitrate from the remaining product.

3. The process of extracting sodium nitrate from raw material which consists of coarse breaking the raw material, adding water to said broken material to form a pulp, separating the insoluble matter therefrom, concentrating the remaining solution whereby sodium chlorid is crystallized therefrom, removing said sodium chlorid, and separating sodium nitrate from the remaining product.

4. The process of extracting sodium nitrate from raw material which consists of disintegrating the raw material, adding water to said disintegrating material and removing the pulp therefrom, separating the insoluble matter therefrom, spontaneously evaporating the remaining solution substantially to dryness, mixing the product of evaporation with mother liquor, heating the mixture, removing sodium chlorid, and separating sodium nitrate from the mixture.

In testimony whereof, I affix my signature in the presence of two witnesses.

MARK R. LAMB.

Witnesses:
CHAS. L. BYRON,
W. H. LIEBER.

---

Correction in Letters Patent No. 1,065,053.

It is hereby certified that in Letters Patent No. 1,065,053, granted June 17, 1913, upon the application of Mark R. Lamb, of Milwaukee, Wisconsin, for an improvement in "Processes of Extracting Sodium Nitrate from Raw Material," an error appears in the printed specification requiring correction as follows: Page 2, line 46, for the word "disintegrating" read *disintegrated;* and that the said Letters Patent should be read with this correction therein that the same may conform to the record of the case in the Patent Office.

Signed and sealed this 22nd day of July, A. D., 1913.

[SEAL.]

C. C. BILLINGS,

*Acting Commissioner of Patents.* tion, however, is not deposited during cooling because the capacity of the cooling niter solution for sodium chlorid increases as the temperature decreases. The remaining solution constitutes the "mother liquor."

It should be understood that it is not desired to be limited to the specific details of the described adaptation of the process, as various modifications of same may occur to a person skilled in the art.

It is claimed and desired to secure by Letters Patent,—

1. The process of extracting sodium nitrate from raw material which consists in adding water thereto and of removing the rock and sand from the mixture whereby a pulp remains, separating the insoluble matter therefrom, evaporating the remaining solution, adding liquor to and heating the product of said evaporation, removing sodium chlorid, and separating sodium nitrate from the remaining product.

2. The process of extracting sodium nitrate from raw material which consists of coarse breaking the raw material, adding water to said broken material, separating the pulp from the mixture, separating the insoluble matter therefrom, concentrating the remaining solution whereby sodium chlorid is crystallized therefrom, removing said sodium chlorid, and separating sodium nitrate from the remaining product.

3. The process of extracting sodium nitrate from raw material which consists of coarse breaking the raw material, adding water to said broken material to form a pulp, separating the insoluble matter therefrom, concentrating the remaining solution whereby sodium chlorid is crystallized therefrom, removing said sodium chlorid, and separating sodium nitrate from the remaining product.

4. The process of extracting sodium nitrate from raw material which consists of disintegrating the raw material, adding water to said disintegrating material and removing the pulp therefrom, separating the insoluble matter therefrom, spontaneously evaporating the remaining solution substantially to dryness, mixing the product of evaporation with mother liquor, heating the mixture, removing sodium chlorid, and separating sodium nitrate from the mixture.

In testimony whereof, I affix my signature in the presence of two witnesses.

MARK R. LAMB.

Witnesses:
CHAS. L. BYRON,
W. H. LIEBER.

---

Correction in Letters Patent No. 1,065,053.

It is hereby certified that in Letters Patent No. 1,065,053, granted June 17, 1913, upon the application of Mark R. Lamb, of Milwaukee, Wisconsin, for an improvement in "Processes of Extracting Sodium Nitrate from Raw Material," an error appears in the printed specification requiring correction as follows: Page 2, line 46, for the word "disintegrating" read *disintegrated;* and that the said Letters Patent should be read with this correction therein that the same may conform to the record of the case in the Patent Office.

Signed and sealed this 22nd day of July, A. D., 1913.

[SEAL.]

C. C. BILLINGS,

*Acting Commissioner of Patents.*

Correction in Letters Patent No. 1,065,053.

It is hereby certified that in Letters Patent No. 1,065,053, granted June 17, 1913, upon the application of Mark R. Lamb, of Milwaukee, Wisconsin, for an improvement in "Processes of Extracting Sodium Nitrate from Raw Material," an error appears in the printed specification requiring correction as follows: Page 2, line 46, for the word "disintegrating" read *disintegrated;* and that the said Letters Patent should be read with this correction therein that the same may conform to the record of the case in the Patent Office.

Signed and sealed this 22nd day of July, A. D., 1913.

[SEAL.]
C. C. BILLINGS,
*Acting Commissioner of Patents.*